United States Patent [19]

Yamazaki

[11] 3,959,964

[45] June 1, 1976

[54] MOUNTING ARRANGEMENT FOR TIMEPIECE COMPONENTS

[75] Inventor: Satoshi Yamazaki, Suwa, Japan

[73] Assignee: Kabushiki Kaisha Suwa Seikosha, Tokyo, Japan

[22] Filed: Feb. 10, 1975

[21] Appl. No.: 548,714

Related U.S. Application Data

[63] Continuation-in-part of Ser. No. 384,870, Aug. 1, 1973, abandoned.

[30] Foreign Application Priority Data

Aug. 3, 1972 Japan ................................ 47-77800

[52] U.S. Cl. ................................ 58/50 R; 58/52 R; 58/55

[51] Int. Cl.$^2$ .................. C04B 19/30; G04B 29/00; G04B 37/00

[58] Field of Search ........................ 58/50 R, 52, 55; 339/17 R

[56] References Cited

UNITED STATES PATENTS

| | | | |
|---|---|---|---|
| 3,757,510 | 9/1973 | Dill | 58/23 R |
| 3,863,436 | 2/1975 | Schwarzschild | 58/53 X |

*Primary Examiner*—Edith Simmons Jackmon
*Attorney, Agent, or Firm*—Blum, Moscovitz, Friedman & Kaplan

[57] ABSTRACT

An electronic timepiece in which a liquid crystal display panel is employed has a maximum display surface area when the electronic timepiece components, including the battery, are mounted behind the display panel. Optimally, the components are mounted in a non-overlapping arrangement.

3 Claims, 3 Drawing Figures

MOUNTING ARRANGEMENT FOR TIMEPIECE COMPONENTS

CROSS REFERENCE TO RELATED APPLICATION

This application is a continuation-in-part of copending application Serial No. 384,870, filed Aug. 1, 1973, for Liquid Crystal Timepiece.

BACKGROUND OF THE INVENTION

In electronic timepieces in which liquid crystal display panels are employed, it has now become commonplace to display hours, minutes and seconds. In addition, it may also be desired to display the day and the date. Under the circumstances, in order to achieve sufficient legibility, it is desirable that the display panel have a large observable surface area.

For a display panel to be operative it must be held in a frame of some sort, provision for electrical connections must be made, a battery must be connected thereto for activating the display, and electronic components for providing a high frequency time standard which can be divided and coded and decoded for activation of the proper portions of the display panel must be connected both to the battery and to the display panel. As is obvious, space must be provided within the watch case for this multiplicity of components.

In order to conserve space, much of the circuitry can be placed upon an IC chip. However, establishment of proper connections between such an IC chip and a display panel are difficult to make by conventional techniques, and assembly of components of miniature size is difficult, especially when such components must be inserted or removed in a specific order due to the fact that they overlap each other. As a result, construction of the watch at the time of manufacture and subsequent repair are both difficult to carry out, particularly where mass production methods are needed for minimizing cost.

SUMMARY OF THE INVENTION

In an electronic timepiece, substantially the entire front surface area thereof is occupied by a liquid crystal display panel mounted in a frame. A power source, for instance a battery, and electronic components for illuminating the display in coincidence with a selected time pattern underlie the display panel in the timepiece casing, and therefore do not obscure the front surface of the timepiece. It is a significant aspect of the arrangement that the battery and electronic circuit components underlying the display panel are mounted in non-overlapping relationship, relative to each other.

Accordingly, an object of the present invention is to provide an electronic timepiece having a liquid crystal panel mounted therein wherein the display surface area of the panel is maximized proportionately to the size of the timepiece.

Another object of the present invention is to provide an electronic timepiece wherein the power source and operatively connected electronic components thereof underlie the display panel in non-overlapping arrangement.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENT

Figure 1:
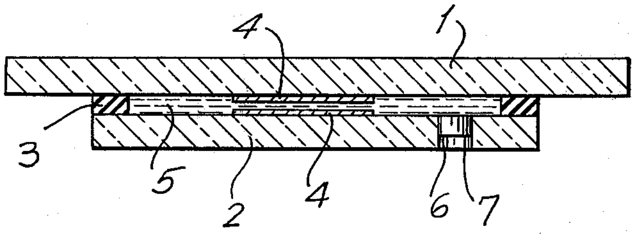
FIG. 1 PRIOR ART
FIG. 1 is a cross-sectional view of a conventional liquid crystal display panel assembly.

A sectional view of a conventional liquid crystal display panel is shown in FIG. 1. The panel includes an upper baseplate 1 and a lower baseplate 2, each being provided with segmented electrode coatings thereon generally indicated by the numeral 4. The panel asembly may be fabricated by, for instance, thermocompressing the baseplates together. The gap between the plates may be sized, for instance, by means of spacer 3 and is usually about 10 microns. Into the panel assembly, a liquid crystal 5 is poured, for instance, through an aperture 6 provided in lower baseplate 2 (in inverted position, of course). Aperture 6 is then closed with a stopper, for instance, a metallic pin 7. To activate the liquid crystal for displaying a time setting, a predetermined voltage is applied to the electrode segments 4 provided in the panel assembly for displaying appropriate characters, in this case numerals. Generally, a typical liquid crystal timepiece includes a power source, usually a battery for energizing the display, a panel assembly as heretofore described, circuitry operatively connecting the power source and display including a high frequency standard time oscillator, means for connecting the circuitry and panel assembly, and a case for housing the timepiece components including a cylindrical section, a frame overlying an end of the section in which the panel assembly is mounted, and a cover member overfitting the other end of the cylindrical section.

Figure 2:
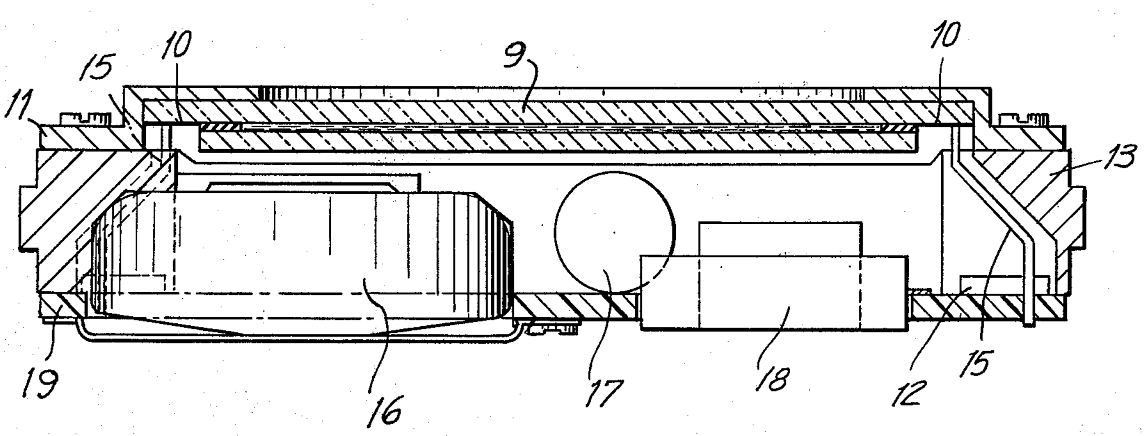
FIG. 2 is a cross-sectional view of a timepiece in accordance with the present invention.
Figure 3:
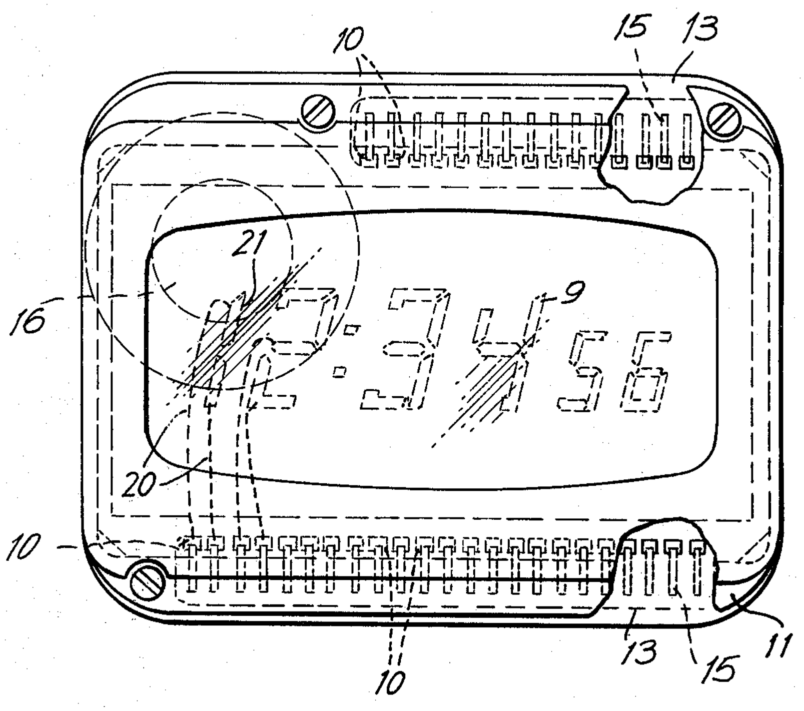
FIG. 3 is a plan view of the timepiece illustrated in FIG. 2.

A mounting arrangement within the scope of the instant invention is seen in FIG. 2. A panel assembly 9 of the type seen in FIG. 1 generally including upper and lower baseplates provided with transparent electrically conductive segmented coatings thereon for selectively displaying hour, minute and second indicia is mounted in a timepiece housing comprising a cylindrical section 13, a frame 11 releasably connected to an end thereof, and a cover member 19 overfitting the other end of cylindrical section 13. A plurality of connectors 15 which operatively connect the segmented electrodes provided on the panel assembly with a conductive plate 12 for relaying timing output signals therefrom are bent inwardly at respective upper ends thereof along the upper baseplate of panel assembly 9 to a respective plurality of printed contacts 10, located along the periphery of the upper baseplate of the panel assembly, as best seen in FIG. 3. Panel assembly 9 is removably mounted in the timepiece housing by frame 11. Power for illuminating the display in the panel assembly and for driving the timepiece circuitry is supplied by battery 16, which powers a standard time high frequency oscillator 17, for supplying a high frequency signal to divider and decoder 18, for thereby providing output signals to flexible metallic conductors 15 through print wiring conductive plate 12. Connections from appropriate positions on conductive plate 12 to printed contacts 10 of display panel 9 are provided by connectors 15 which are preferably metallic and flexible. The arrangement of components 15, 16, 17 and 18, as is evident from FIGS. 2 and 3, is nonoverlapping and this non-overlapping relationship therebetween is a critical aspect of the invention. The components are supported on cover 19, which may, for instance, be releasably secured to cylindrical section 13 for access within the timepiece housing. As may be observed with reference to FIGS. 2 and 3, connectors 15 are arranged between decoder 18 and a plurality of segment leads 20. Accordingly, an output signal from decoder 18 is transmitted to conductive plate 19 and to the segment leads connected to contacts 10 along the circumference of panel assembly 9 through connectors 15.

The connective arrangement between connectors 15 and contacts 10 of panel assembly 9 is seen with reference to FIG. 3, which is a plan view of the arrangement illustrated in FIG. 2.

Referring now to FIG. 3, it may be observed that none of the timepiece components protrude beyond opposed ends of cylindrical section 13, and the substantially upstanding arrangement of connectors 15 within the timepiece housing substantially in parallel with the interior sidewall of cylindrical section 13 facilitates emplacement of the electronic components within the watch, so that the arrangement thereof is non-overlapping, whereby none of the timepiece components protrude beyond opposed ends of the housing. As best seen in FIG. 3, a plurality of leads 20, connect contacts 10 and discrete segments 21 of segmental layer 4 for illuminating a selective time display.

The arrangement also makes it practicable to employ a flat watch construction, since all components thereof are housed within cylindrical section 13. Additionally, since the operative connections between the oscillator and coding circuits of the watch and the display panel, i.e., connectors 15, are vertically arranged on cover 19, access within the timepiece housing may be easily had during assembly and disassembly of the timepiece. Additionally, by vertically arranging connectors 15 within the timepiece housing, the observable display surface area of panel assembly 9 is maximized since other operative components of the timepiece may be mounted behind panel assembly 9. Moreover, the non-overlapping arrangement of components in the timepiece housing behind panel assembly 9 provides a timepiece arrangement with a flattened construction.

It will thus be seen that the objects set forth above, among those made apparent from the preceding description, are efficiently attained, and since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A mounting arrangement for components of an electronic timepiece of the type including, in operative combination, a liquid crystal display panel assembly provided with segments for selectively illuminating a digital display, a power source, a standard time high-frequency oscillator driven by the power source, a divider for dividing the high frequency signal transmitted thereto from the oscillator, and a decoder for translating the divided signals to output signals which are transmitted to the panel assembly for selectively illuminating segments thereof, the mounting comprising a housing including a cylindrical section having opposed ends and a continuous interior sidewall, a frame releasably connected to one end of the cylindrical section, and a cover connected to the other end thereof, the liquid crystal display panel assembly underlying and being supported by the frame for thereby exposing substantially the entire display surface of the panel assembly through an annulus defined by the frame; the battery, oscillator and decoder being substantially planarly mounted within the housing and on the cover thereof; a conductive plate mounted within the housing on the cover thereof; a plurality of connectors having respective ends mounted in the conductive plate and substantially upstanding thereon, the connectors having respective other ends connected to the panel assembly for transmitting an output signal from the decoder to the panel assembly for thereby illuminating a determined time display, said connectors being arranged between said decoder and the illuminable segments on the display panel; whereby the arrangement of components within the housing is non-overlapping and a flattened timepiece construction is obtained.

2. The mounting arrangement as claimed in claim 1, including contacts provided on the panel assembly, and a plurality of leads for connecting the contacts and segments provided on the panel assembly, each connector including an elbow proximate its other end and each other end of a connector being secured to a discrete contact.

3. The mounting arrangement as claimed in claim 1, wherein each connector has a configuration substantially corresponding to the interior sidewall of the cylindrical section and is substantially parallel thereto.

* * * * *